(12) United States Patent
Tonuzi (10) Patent No.: US 11,720,747 B2
(45) Date of Patent: *Aug. 8, 2023

(54) METHOD AND APPARATUS FOR IMPROVED ANALYSIS OF LEGAL DOCUMENTS

(71) Applicant: Matthew M. Tonuzi, Jacksonville, FL (US)

(72) Inventor: Matthew M. Tonuzi, Jacksonville, FL (US)

(*) Notice: Subject to any disclaimer, the term of this patent is extended or adjusted under 35 U.S.C. 154(b) by 268 days.

This patent is subject to a terminal disclaimer.

(21) Appl. No.: 17/235,999

(22) Filed: Apr. 21, 2021

(65) Prior Publication Data

US 2021/0240926 A1 Aug. 5, 2021

Related U.S. Application Data

(63) Continuation-in-part of application No. 16/899,090, filed on Jun. 11, 2020, now Pat. No. 11,087,421.

(60) Provisional application No. 62/859,788, filed on Jun. 11, 2019.

(51) Int. Cl.
*G06Q 30/02* (2023.01)
*G06F 40/205* (2020.01)
*G06F 16/11* (2019.01)
*G06F 40/109* (2020.01)
*G10L 13/08* (2013.01)
*G06Q 50/18* (2012.01)
*G06Q 10/10* (2023.01)

(52) U.S. Cl.
CPC ............ *G06F 40/205* (2020.01); *G06F 16/11* (2019.01); *G06F 40/109* (2020.01); *G10L 13/08* (2013.01); *G06Q 10/10* (2013.01); *G06Q 50/18* (2013.01)

(58) Field of Classification Search
CPC ....... G06Q 50/18; G06F 40/205; G06F 40/40; H04L 67/06; G06K 9/00469; G10L 13/02
See application file for complete search history.

(56) References Cited

U.S. PATENT DOCUMENTS

| | | | | |
|---|---|---|---|---|
| 9,141,823 | B2* | 9/2015 | Dawson | H04L 9/00 |
| 2007/0208687 | A1* | 9/2007 | O'Conor | G06F 3/167 |
| 2009/0086953 | A1* | 4/2009 | Vendrow | H04W 40/00 |
| | | | | 379/207.02 |
| 2010/0202597 | A1* | 8/2010 | Koenigs | H04M 3/53375 |
| | | | | 704/235 |
| 2012/0131189 | A1* | 5/2012 | Smart | G06F 21/64 |
| | | | | 709/225 |
| 2012/0191619 | A1* | 7/2012 | Gross | G06Q 10/0637 |
| | | | | 705/310 |
| 2012/0240045 | A1* | 9/2012 | Bradley | G09B 21/006 |
| | | | | 715/716 |

(Continued)

*Primary Examiner* — Hassan Mrabi
(74) *Attorney, Agent, or Firm* — Trace H. Jackson; Rogers Towers PA (57) ABSTRACT

The present disclosure provides apparatus and method for improving analysis of legal documents. A legal document is parsed to generate a list of desired legal authorities. These legal authorities are then acquired from a trusted repository of authorities and processed through a modified text-to-speech program in a desired order to obtain a brief audio recording of the cited authorities. Citing references to the legal authorities may be filtered as appropriate and added to the generated list of desired legal authorities.

12 Claims, 5 Drawing Sheets

(56) References Cited

U.S. PATENT DOCUMENTS

2013/0036162 A1\* 2/2013 Koenigs ................. H04L 51/56
    382/276
2013/0346144 A1\* 12/2013 Ferren ..................... H04N 5/91
    705/7.29

\* cited by examiner

METHOD AND APPARATUS FOR IMPROVED ANALYSIS OF LEGAL DOCUMENTS

CROSS-REFERENCE TO RELATED APPLICATIONS

This application claims priority to U.S. patent application Ser. No. 16/899,090, filed on Jun. 11, 2020, and entitled Method and Apparatus for Improved Analysis of Legal Documents, which itself claims priority to U.S. Provisional Patent Application No. 62/859,788, filed on Jun. 11, 2019, and entitled Method and Apparatus for Improved Analysis of Legal Documents. The contents of each of these applications are incorporated herein by reference.

FIELD OF THE DISCLOSURE

The present disclosure relates to a method and apparatus for improved analysis of legal documents by using an electronic scraper to parse documents for citations to generate a list of legal authorities, and then configuring an audio device to play audio recordings based on those legal authorities.

BACKGROUND OF THE DISCLOSURE

Lawyers are busy people, but they are charged with detailed knowledge of the minutiae of tens or hundreds of cases at any given time. The practice of law may be loosely divided into two categories: litigation and transactional practice.

Litigation includes adversarial proceedings. An adversarial proceeding typically includes a series of hearings, which may culminate in a trial or other final, dispositive hearing. In preparation for the hearings, each side often submits one or more briefs. These briefs typically include citations to relevant authority, especially controlling case law. (For example, a brief submitted to the U.S. District Court for the Middle District of Florida optimally will include citations to decisional case law from the U.S. Court of Appeals for the Eleventh Circuit and the U.S. Supreme Court, as judges in the Middle District of Florida are bound by the decisions of the latter two courts.)

After submitting the briefs, lawyers for one or more sides to an adversarial proceeding may be called for a hearing before a judge or other tribunal. To prepare for these hearings, lawyers are required to study not only their own briefs, but the briefs of other parties to the proceeding, and each and every case cited in each and every brief. This is important because apparently binding case law may be distinguishable from the facts before the tribunal. Lawyers are required to think on their feet in front of the tribunal, which may ask questions to distinguish the cases.

Similarly, transactional practice may also require a detailed knowledge of case law. For example, practice before the U.S. Patent and Trademark Office requires an intimate understanding of the case law relevant to the legal standards at issue in patent proceedings (e.g., novelty and obviousness). While condensed summaries of these cases are known in the art, there is not currently an easy way to interface with the primary sources involved without physically reading the cases.

SUMMARY OF THE DISCLOSURE

Accordingly, the present invention provides a method and apparatus for improving analysis of legal documents. According to the present disclosure, the authorities underlying the legal documents may be extracted from the documents and audibly read to lawyers.

First, legal documents are analyzed to extract citations to cases and other pertinent legal authorities. Second, the cases and legal authorities are automatically obtained from one or more lists of trusted authorities, arranged according to predetermined criteria, and finally read using a text-to-speech automation or other similar tool.

Additionally, some of the trusted authorities may include hyperlinks or other pathways to access additional resources that cite a case accessed by the trusted authority. In some embodiments, these citing references may be accessed, obtained, arranged, and read, as described above.

BRIEF DESCRIPTION OF THE DRAWINGS

The accompanying drawings, which are incorporated in and constitute a part of this specification, illustrate several embodiments of the disclosure and, together with the description, serve to explain the principles of the disclosure.

DETAILED DESCRIPTION

The present disclosure provides generally for methods and apparatus for improving analysis of legal documents. According to the present disclosure, legal documents are parsed to obtain relevant legal authorities. These authorities may then be obtained from one or more trusted repositories of authorities, arranged according to certain criteria, and read for the lawyer.

In the following sections, detailed descriptions of examples and methods of the disclosure will be given. The description of both preferred and alternative examples though thorough are exemplary only, and it is understood that, to those skilled in the art, variations, modifications, and alterations may be apparent. The examples do not limit the broadness of the aspects of the underlying disclosure as defined by the claims.

Figure 1:
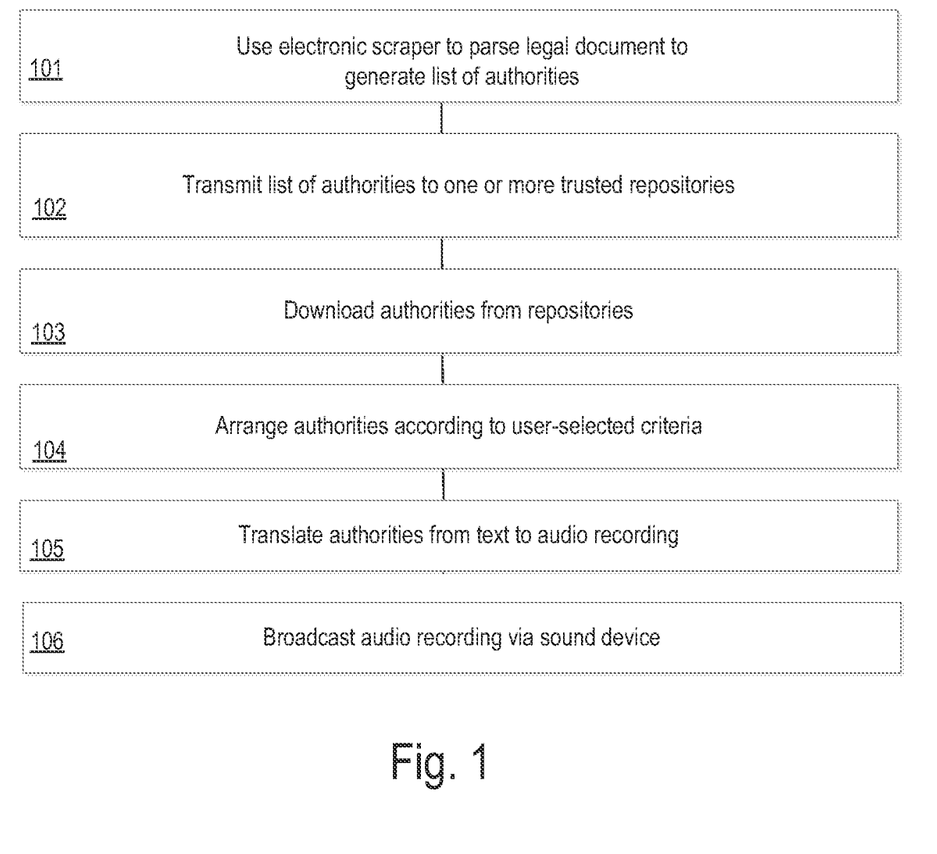
FIG. 1 illustrates an exemplary embodiment of method steps in accordance with the present disclosure.

Referring now to FIG. 1, a flowchart illustrating an exemplary embodiment of method steps in accordance with the present disclosure is shown. At step 101, an electronic scraper is used to parse a legal document to obtain legal authorities relied upon for the conclusions stated therein. An electronic scraper is an apparatus or subroutine that searches for strings of text in a document meeting certain criteria (e.g., legal citations) and extracts those strings (along with sufficient context) to generate a list of legal citations. In some embodiments, the scraper may first dissect the document into subsets (e.g., lines of text) and search through those subsets. An exemplary embodiment of such a scraper is the subroutine (or apparatus executing the subroutine) defined in step 101.

An exemplary example of a document to be scraped is a motion filed in a court. Motions (and/or accompanying memoranda of law) are ideally supported with legal authority. This legal authority may come in the form of controlling case law (e.g., decisional authority from the court's reviewing tribunal or the relevant supreme court), persuasive case law (e.g., decisional authority from sister courts or reviewing tribunals of other courts), treatises, or the like. A motion may be parsed to extract the legal authorities cited by the motion. While the present disclosure describes an embodiment of this invention relating to motions, other legal documents that may be improved by the present invention include transactional documents and law school outlines. In the latter cases, pre-built or customizable databases may be appropriate for reference. For example, if an input to the present system is a law school outline for a patent law course, then the output of the present system may include standard cases in that area and relevant excerpts from the Manual for Patent Examining Procedure, even if those cases and excerpts are not explicitly cited in the outline.

Figure 4:
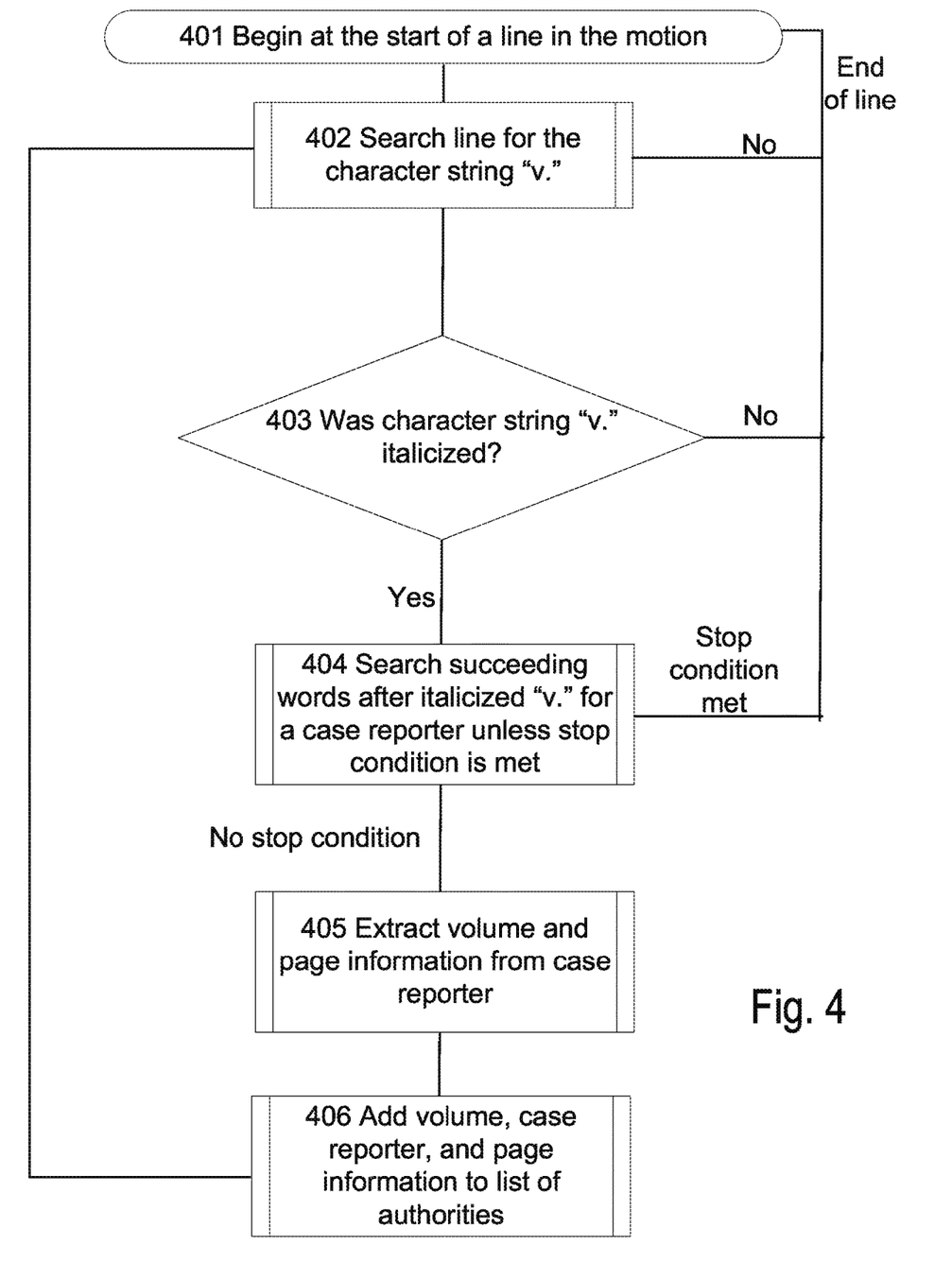
FIG. 4 illustrates an exemplary flowchart for use in connection with an electronic scraper of authority citations.

In exemplary embodiments, the motion cites the legal authorities in a standardized form. For example, the motion may use the system of citation dictated by THE BLUEBOOK: A UNIFORM SYSTEM OF CITATION, a relevant state style manual (e.g., Rule 9.800, *Florida Rules of Appellate Procedure*; FLA. ST. UNIV., FLORIDA STYLE MANUAL; etc.), or the like. In particular, regardless of the style manual, case law is almost universally cited in the same format: [plaintiff] v. [defendant], [reporter volume] [reporter name] [page of the volume on which the case begins] [, optionally, a pincite] ([tribunal name and year of decision]). (Case law is not cited in this format typically has keywords indicating such; for example, cases involving only one party might begin with the Latin phrase "In re.") Accordingly, an exemplary subroutine to search for a case could operate on the following loop, which is also shown in FIG. 4 (demonstrated here as pseudocode amenable to most logic paradigms or programming languages, such as Python):

a. 401: for each line of the motion:
b. 402: iterate through each line until finding the following character string: "v."
c. 403: if "v." is not italicized, then continue iterating.
d. 404: else, if "v." is italicized, then search the succeeding words for matches with a prepopulated list of case reporters unless a stop condition is met.
e. 405: extract the number preceding (i.e., the volume) and succeeding (i.e., the page) the case reporter, along with the case reporter itself. If any of this information is not present in the line, then check the succeeding line for the case reporter, volume, or page information.
f. 406: add the volume, case reporter, and page to the list of authorities.
g. repeat from 402 until the end of the line of the motion; then proceed to next line.

For example, suppose the above subroutine were applied to the following line from a motion:

Judicial review of Acts of Congress has been the norm since the earliest days of the Republic. See *Marbury* v. *Madison*, 5 U.S. 137 (1803). In *Marbury*, the U.S. Supreme Court declared that the Constitution was itself a form of law.

According to the exemplary subroutine provided above, the first line would be scanned to look for an instance of an italicized v followed by a period. Upon finding none, the scanning entity would move to the second line. At the second line, the desired italicized "v." would be found.

But one could imagine non-citation sentences that end with an italicized "v" (and, perhaps due to sloppy drafting, include an italicized period). For example, "Jones posted his risqué photo to the listserv." Accordingly, in some embodiments, the search criteria may also require the citation to include a space preceding a lowercase v; i.e., the search would locate instances of: "v.". Alternatively, if the case reporter is not found in the words succeeding the italicized "v.", then it may be assumed that the italicized "v." was a false positive, and the process may begin again.

Similarly, in some jurisdictions, case law citations are underlined, instead of italicized. Options may be provided for a user to select a preferred case law formatting. Moreover, in other formats in which the party name portion of a case law citation has no special formatting at all (such as the format prescribed by THE BLUEBOOK for case citations in footnotes), this step may be skipped in lieu of the next step. However, this may not be the best mode in which to practice the present invention, as it is less efficient.

The search criteria after the italicized v may include a stop condition as a control. A primary control, which ultimately may provide the useful information to a scraper, is searching a predetermined number of "words" (where "word" may be defined, for purposes of a program, as a discrete number of characters surrounded by spaces) after the v to find the reporter information. In some embodiments, ten characters after the italicized v may be an appropriate stop criterion, although a larger or smaller number of characters may be chosen at need. (For example, if the user knows that there are lengthy case names involved in the legal document, such as *Sovereign Military Hospitaller Order of Saint John of Jerusalem of Rhodes and of Malta* v. *Fla. Priory of the Knights Hospitallers of the Sovereign Order of Saint John of Jerusalem, Knights of Malta, The Ecumenical Order*, 809 F.3d 1171 (11th Cir. 2015), then the user may have a higher number of characters used as the stop condition.) Similarly, instead of a number of characters, the user may simply allow the scraper to continue reviewing the legal document until it reaches a reporter (as described below) or another italicized v (which may indicate the presence of another case).

A list of acceptable reporters (e.g., *United States Reports, Southern Reporter, Atlantic Reporter*) may be pre-populated and include the reporters' respective abbreviations. Upon finding such an abbreviation, numbers preceding and succeeding the reporter may be added to a list of cases. In the above example, "5 U.S. 137" would be added to the list.

The scraper may then continue to the end of the line. Upon finding no more cases, it may continue to the next line. In the above example, there are no additional cases. Accordingly, the subroutine ends.

While the above-described subroutine may successfully scrape cases, it does not necessarily control for other legal authority, such as treatises. The scraper may ascertain these other legal authorities through other means; for example, THE BLUEBOOK mandates that treatises be cited in "small caps." The scraper may scan the motion (or other legal memorandum) for citations in "small caps." Alternatively, a user may input other similar custom search criteria into the scraper, as needed. The user may also manually designate authorities of interest, such as, for example, by highlighting the authorities. If such an option is enabled, then the scraper will also scrape highlighted material to add to the list of authorities.

At step 102, the list of authorities is transmitted via a communications device to one or more trusted repositories of authorities. In exemplary embodiments, these authorities are capable of accepting search queries in the format described above. For example, popular legal research resources such as Westlaw and Lexis-Nexis can accept reporter information as a search query and return the relevant case. Other resources may be more optimal or cost-efficient for different types of legal authorities; for example, Google Scholar may be a more useful repository of treatises. A list of relevant repositories may be suggested or manually inputted by the user.

At step 103, these authorities may then be downloaded via the same communications device. For example, Westlaw allows a user to download PDF versions of the source documents relevant to the authority. Other repositories may allow for similar textual access. In some embodiments, the authorities may not necessarily need to be downloaded, so long as the text of the authority is stored in a temporary memory module appropriate for processing at step 105.

Figure 5:
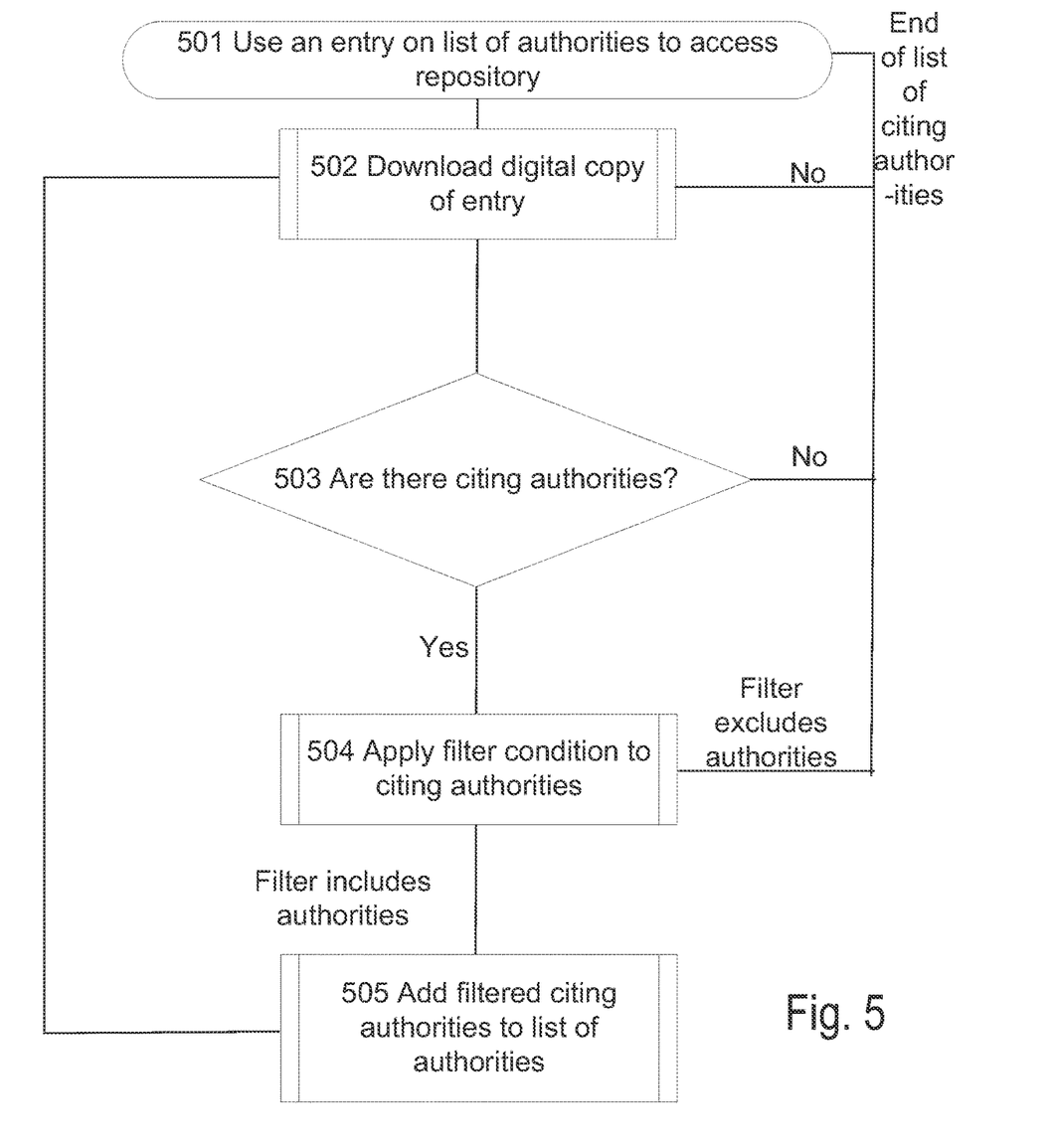
FIG. 5 illustrates an exemplary flowchart for use in connection with obtaining citing references as part of the use of the electronic scraper of authority citations.

Referring briefly to FIG. 5, an additional algorithm is disclosed for adding "citing authorities" to the list of authorities. Often, trusted repositories of legal authorities (such as Westlaw or Lexis) have an option to access subsequent legal authorities that may cite to the accessed legal authority. These citations may give an indication of the strength of the originally accessed authority or provide additional analysis on the topic at issue. Accordingly, it may be useful to a lawyer to have legal authorities cited in a legal document as well as the authorities that cite to those authorities.

Thus, at step 501, a legal authority may be accessed on the repository. At step 502, as at step 103, a digital copy of the authority is downloaded. At step 503, the repository is queried to determine whether the authority has any linked citing authorities. For example, the repository Westlaw has an additional tab that is operative only when the authority has linked citing authorities.

At step 504, a filter condition may be applied to the list of citing authorities. This may be desirable in situations in which the accessed authority has an impracticably large number of citing authorities. For example, *Marbury* v. *Madison* has 32,125 citing references, which may not be desirable to carry out the purpose of the present invention. Accordingly, filter conditions may be used to narrow down the number of citing references. These filter conditions may include, by way of non-limiting example, information about the jurisdiction of the citing references (e.g., particular courts), years associated with the citing references, editorial information such as the depth of treatment of the cited reference, procedural posture of the citing reference (if it is a case), law review ranking or type, key words or phrases, connectors, etc. For example, a practitioner wishing to cite *Marbury* v. *Madison* in federal district court in Florida may be primarily interested in decisions by the Supreme Court and the Eleventh Circuit, issued within the preceding three years. Such a filter would narrow the 32,125 references to 27 references.

At step 505, the filtered citing authorities may be added to the list of authorities. In this way, citing authorities of these citing authorities may be found. Given the potential for an endless loop, a stop condition may be applied here as well. For example, citing authorities may no longer be added when the number of authorities on the list exceeds 100.

Referring back to FIG. 1, at step 104, the authorities may then be arranged according to user-selected criteria. For example, the user may wish to arrange the authorities in the same order in which the authorities are arranged in the underlying legal memorandum. Alternatively, the user may wish to arrange the authorities in order of precedential value, such as by court (e.g., all relevant state/U.S. Supreme Court opinions, followed by all appellate opinions, followed by all trial court opinions, followed by opinions from other jurisdictions) or by other quantification (e.g., number of citing references). The user may also manually designate an order of the cases.

Finally, at step 105, the arranged authorities are processed through a modified text-to-speech reader. Text-to-speech software is well-known in the art. However, the modifications necessary to make such algorithms practical for legal authorities are not. For example, it would not be especially useful to the lawyer attempting a quick study of relevant case law for the following passage to be read word-for-word:

The judiciary's reluctance to expand the protections afforded by the copyright without explicit legislative guidance is a recurring theme. See, e.g., *Teleprompter Corp.* v. *CBS,* 415 U.S. 394, 94 S.Ct. 1129, 39 L.Ed.2d 415 (1974); *Fortnightly Corp.* v. *United Artists,* 392 U.S. 390, 88 S.Ct. 2084, 20 L.Ed.2d 1176 (1968); *White-Smith Music Publishing Co.* v. *Apollo Co.,* 209 U.S. 1, 28 S.Ct. 319, 52 L.Ed. 655 (1908); *Williams and Wilkins* v. *United States,* 487 F.2d 1345, 203 Ct.Cl. 74 (1973), affirmed by an equally divided court, 420 U.S. 376, 95 S.Ct. 1344, 43 L.Ed.2d 264 (1975). Sound policy, as well as history, supports our consistent deference to Congress when major technological innovations alter the market for copyrighted materials.

Accordingly, the text may be processed to remove extraneous elements, such as case citations or star pagination. This may be done using a method similar to the method used by the parser in step 101; for example, a loop through the text of the authority may remove all instances of an asterisk followed by a series of numbers. In other embodiments, a case citation may be replaced by an indication of the strength of the authority for which a tribunal cites decisional authority. For example, consider the exemplary text set forth in the description of step 101:

Judicial review of Acts of Congress has been the norm since the earliest days of the Republic. See *Marbury* v. *Madison,* 5 U.S. 137 (1803). In *Marbury,* the U.S. Supreme Court declared that the Constitution was itself a form of law.

The text-to-speech processor may not literally say "See *Marbury* v. *Madison,* 5 U.S. 137 (1803)." Instead, it may use any combination of the cited reporter and the parenthetical date information to ascertain the identity of the tribunal issuing the decision. In this way, the processor may substitute the citation information (which was scraped to generate the list of legal authorities) with alternative case information based on the citation information. This may occur with reference to a database. For example, if the reporter information takes the form XXX U.S. YYY, then a database may correlate that with the string "U.S. Supreme Court case," which the text-to-speech processor may convert into an audible phrase. In another example, if the citation information includes a string of the form "(Fed. Cir. 2020)," then a database may correlate that with the string "Federal Circuit case," which the text-to-speech processor may convert into a different audible phrase that may also include a year associated with the case. In some embodiments, then, the text-to-speech processor may say "See *Marbury* v. *Madison,* a U.S. Supreme Court case" or "*But see Amneal Pharmaceuticals LLC* v. *Almirall, LLC,* a 2020 Federal Circuit case." This would allow the lawyer to quickly and easily understand the strength of the cited authority, without being bogged down by reporter information. In some embodiments, a different voice may add the annotation "a U.S. Supreme Court case" to ensure the reader that this is not part of the case text as reported.

Similarly, the text-to-speech processor might refer to a database of abbreviations to convert sometimes complex case abbreviations into human-understandable sounds. For example, in a brief, the above Federal Circuit case would likely have been written as *Amneal Pharma. LLC* v. *Almiral, LLC*. Reference to a lookup table, such as one associated with THE BLUEBOOK would allow the text-to-speech processor to convert "Pharma." to "Pharmaceutical."

In some embodiments, a processor or controller in logical connection with the text-to-speech converter may perform any of the subroutines described in step 105, such as converting the genericized version of the citation to a document with the genericized citation, transforming a citation with abbreviations into a citation with no abbreviations, or removing other extraneous elements from the text of the legal document. The output of these subroutines may then be input into the text-to-speech processor to minimize the computational requirements on the text-to-speech processor. Moreover, in some embodiments, such methods and apparatus may be used to modify any legal document. As such, a document that includes legal citations may be electronically scraped, for example, by a method described herein; a legal citation may be identified by the electronic scraper; the legal citation may then be compared (e.g., with a controller or processor) with a database or evaluated by a set of criteria to determine a genericized version of the citation; and the controller or processor may replace the legal citation with the genericized citation in the legal document. Then, in some embodiments, a text-to-speech processor may convert the legal document including the genericized citation into an audible format. Ideally, such methods may be used to convert each legal citation (or substantially all legal citations) in the legal document to genericized versions. In this way, while the legal authorities underlying the legal document may not be collated in an audible format, the legal document itself may be transformed into a document more suitable for listening by a human (i.e., without complex citations to clutter the listening experience).

In general, legal documents include cases, motions, and other official legal documents. However, the term "legal document" encompasses any document that includes legal case citations, so that law outlines, informal notes, and other documents could be used by apparatus and methods described herein. Further, the term "legal citation" generally refers to case citations, but could also refer to other citations in legal documents, including journal articles, treatises, and the like. "Genericized versions" of cases refer to case citations with alternative case information substituted in for the literal citation; for example, this includes replacing "5 U.S. 137 (1803)" with "a U.S. Supreme Court case."

The text-to-speech processor may generate an audibly perceptible file format, such as an MP3 file suitable for playing on a wide variety of devices at step 106. The audibly perceptible file format may also be a WAV, MIDI, MPG, or other similar format. This may then be audibly broadcast via, for example, a smart device's audio output. This may occur through loudspeakers connected to the smart device, or through an external speaker connected to the smart device via Bluetooth, Wi-Fi, or an equivalent communications medium.

The text-to-speech conversion may occur through any suitable speech synthesizer and include a concatenation synthesizer, unit-selection synthesizer, diphone synthesizer, or an articulatory synthesizer. Some embodiments may also include a deep learning-based synthesizer.

Figure 2:
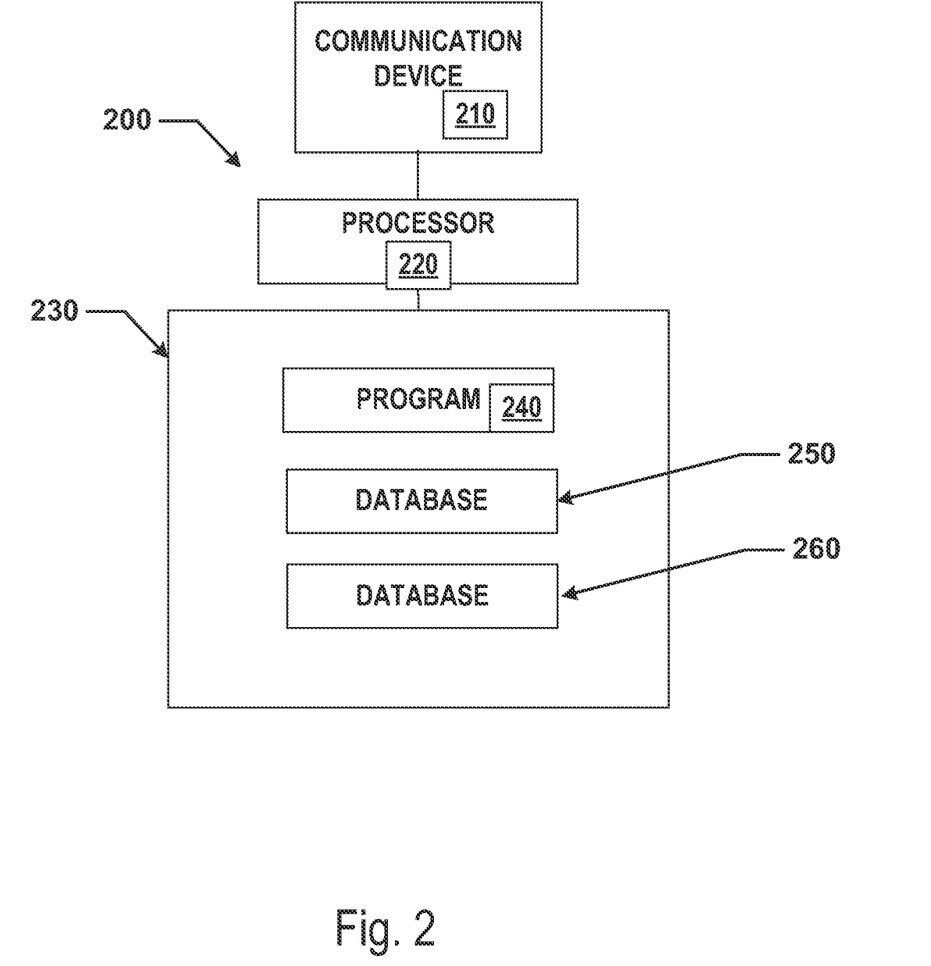
FIG. 2 illustrates a controller that may be used to implement aspects of the present disclosure, including executable software, as well as an apparatus capable of executing aspects of the present method.

Referring now to FIG. 2, an automated controller is illustrated that may be used to implement various aspects of the present invention, in various embodiments, and for various aspects of the present invention, controller 200 may be included in one or more of: a wireless tablet or handheld device, a server, a rack mounted processor unit. The controller may be included in one or more of the apparatus described above, such as a server, and a network access device. The controller 200 includes a processor unit 220, such as one or more semiconductor-based processors, coupled to a communication device 210 configured to communicate via a communication network (not shown in FIG. 2). The communication device 210 may be used to communicate, for example, with one or more online devices, such as a personal computer, laptop, or a handheld device, or a server associated with the trusted repositories of authorities.

The processor 220 is also in communication with a storage device 230. The storage device 230 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

The storage device 230 can store a software program 240 with executable logic for controlling the processor 220. The processor 220 performs instructions of the software program 640, and thereby operates in accordance with the present invention. The processor 220 may also cause the communication device 210 to transmit information, including, in some instances, control commands to operate apparatus to implement the processes described above. The storage device 230 can additionally store related data in a database 250 and database 260, as needed.

Figure 3:
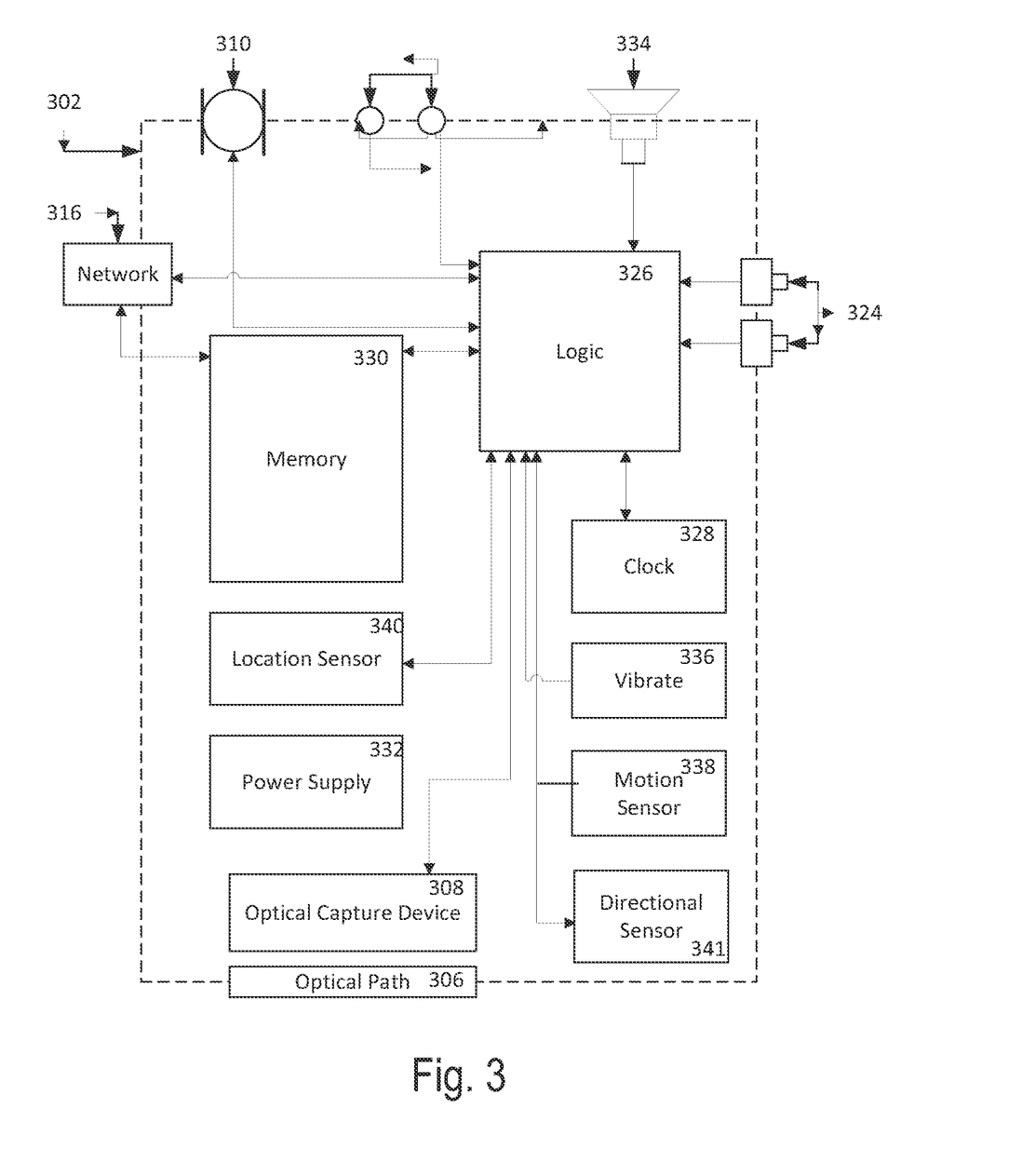
FIG. 3 illustrates a mobile device that may be used in some implementations of the present invention.

Referring now to FIG. 3, a block diagram of an exemplary mobile device 302 is shown. The mobile device 302 comprises an optical capture device 308 to capture an image and convert it to machine-compatible data, and an optical path 306, typically a lens, an aperture or an image conduit to convey the image from the rendered document to the optical capture device 308.

A microphone 310 and associated circuitry may convert the sound of the environment, including spoken words, into machine-compatible signals. Input facilities may exist in the form of buttons, scroll wheels, or other tactile Sensors such as touch-pads. In some embodiments, input facilities may include a touchscreen display.

Visual feedback to the user is possible through a visual display, touchscreen display, or indicator lights. Audible feedback 334, such as the decisional law being read to the lawyer, may come from a loudspeaker or other audio transducer. Tactile feedback may come from a vibrate module 336.

The mobile device 302 comprises logic 326 to interact with the various other components, possibly processing the received signals into different formats and/or interpretations. Logic 326 may be operable to read and write data and program instructions stored in associated storage or memory 330 such as RAM, ROM, flash, or other suitable memory. It may read a time signal from the clock unit 328. In some embodiments, the mobile device 302 may have an on-board power supply 332. In other embodiments, the mobile device 302 may be powered from a tethered connection to another device, such as a Universal Serial Bus (USB) connection.

The mobile device 302 also includes a network interface 316 to communicate data to a network and/or an associated computing device. Network interface 316 may provide two-way data communication. For example, network interface 316 may operate according to the internet protocol. As another example, network interface 316 may be a local area network (LAN) card allowing a data communication connection to a compatible LAN. As another example, network interface 316 may be a cellular antenna and associated circuitry which may allow the mobile device to communicate over standard wireless data communication networks. In some implementations, network interface 316 may include a Universal Serial Bus (USB) to supply power or transmit data. In some embodiments other wireless links may also be implemented.

CONCLUSION

A number of embodiments of the present disclosure have been described. While this specification contains many specific implementation details, there should not be construed as limitations on the scope of any disclosures or of what may be claimed, but rather as descriptions of features specific to particular embodiments of the present disclosure. While embodiments of the present disclosure are described herein by way of example using several illustrative drawings, those skilled in the art will recognize the present disclosure is not limited to the embodiments or drawings described. It should be understood the drawings and the detailed description thereto are not intended to limit the present disclosure to the form disclosed, but to the contrary, the present disclosure is to cover all modification, equivalents and alternatives falling within the spirit and scope of embodiments of the present disclosure as defined by the appended claims.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted the terms "comprising", "including", and "having" can be used interchangeably.

Certain features that are described in this specification in the context of separate embodiments can also be implemented in combination in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while method steps may be depicted in the drawings in a particular order, this should not be understood as requiring that such operations be performed in the particular order shown or in a sequential order, or that all illustrated operations be performed, to achieve desirable results.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order show, or sequential order, to achieve desirable results. Nevertheless, it will be understood that various modifications may be made without departing from the spirit and scope of the claimed disclosure.

What is claimed is:

1. A method for analyzing a legal document comprising one or more legal authorities, the method comprising the steps of:
   using an electronic scraper to parse the legal document to generate a list of the legal authorities in a format suitable for input into a repository of legal documents;
   wherein the step of parsing the legal document comprises a case law subroutine, which comprises the steps of:
   determine a stop condition;
   for each text-based line of the legal document;
   search text for the character string "v.";
   if "v." is not italicized, then continue searching;
   else, if "v." is italicized, then search the succeeding words for characters matching character strings associated with a prepopulated list of case reporters to identify the case reporter associated with the case law until the stop condition is met;
   extract numerical value preceding the case reporter;
   extract numerical value succeeding the case reporter;
   generate an entry on the list of legal authorities comprising the numerical value preceding the case reporter, the case reporter, and the numerical value succeeding the case reporter;
   transmitting the list of the legal authorities to the repository via a communications device in logical connection with the scraper;
   receiving, via the communications device, from the repository documents embodying the legal authorities within the list of the legal authorities;
   translating the documents embodying the legal authorities to one or more files comprising an audibly perceptible format, wherein the audibly perceptible format comprises a sound file comprising a spoken version of text associated with the legal authorities;
   removing from the files at least a first or a second portion of a citation to a case, wherein the first portion of the citation to the case comprises case reporter information associated with the case, and the second portion of the citation to the case comprises an identity of a court associated with the case; and
   audibly broadcasting the files with a sound device with a voice synthesizer, wherein the voice synthesizer generates alternative case information to substitute into the files in place of at least the first or second portion of the citation to the case.

2. The method of claim 1, wherein the case law subroutine of parsing the legal document comprises the steps of:

continue searching the text-based line for an additional character string "v.";
if the additional character string "v." occurs within the text-based line, then repeat this loop from the step of if "v." is not italicized, then continue searching; and
else, if the text-based line does not consist of an additional character string "v.", then move to a second text-based line.

3. The method of claim 2, wherein the step of transmitting the list of legal authorities further comprises the execution of a citing references subroutine comprising:
assessing the presence or absence of citing authorities for a given legal authority;
based upon a presence of citing authorities, applying a filter condition to obtain a filtered list of citing authorities; and
adding the filtered list of citing authorities to the list of legal authorities.

4. The method of claim 1, wherein the step of parsing the legal document comprises a treatise subroutine, which comprises the steps of:
for each text-based line of the legal document:
search text-based line for a text string comprising a length of greater than a first predetermined number of characters that uses small caps formatting;
search a second predetermined number of characters after the text string;
if the second predetermined number of characters after the text string does not comprise one or more numerical values, then continue searching the text-based line for an additional character string comprising small caps formatting;
else, if the second predetermined number of characters after the text string does comprise one or more numerical values, then extract the numerical values;
generate an entry on the list of legal authorities comprising the text string that uses small caps formatting and the numerical values;
continue searching the text-based line for an additional character string comprising a length of greater than the first predetermined number of characters that uses small caps formatting;
if the additional character string comprising a length of greater than the first predetermined number of characters that uses small caps formatting, then repeat this loop from the step of search a second predetermined number of characters after the text string; and
else, if the text-based line does not consist of an additional character string comprising a length of greater than the first predetermined number of characters that uses small caps formatting, then move to a second text-based line.

5. The method of claim 1, further comprising the step of transmitting the files via a communications network to a smart device comprising a processor, an audio output, a memory, and a communications access device in logical connection with the communications network.

6. The method of claim 5, wherein the step of audibly broadcasting the files occurs via an audio output associated with a smart device.

7. An apparatus for improved analysis of legal documents comprising one or more legal authorities, the apparatus comprising:
a processor;
a communications access device in logical connection with a communications network;
a memory comprising software with instructions executable on command to:
parse the legal document to generate a list of the legal authorities in a format suitable for input into a repository of legal documents, wherein the instructions for parsing the legal document comprises a case law subroutine, which comprises the steps of:
determine a stop condition;
for each text-based line of the legal document:
search text for the character string "v.";
if "v." is not italicized, then continue searching;
else, if "v." is italicized, then search the succeeding words for characters matching character strings associated with a prepopulated list of case reporters to identify the case reporter associated with the case law until the stop condition is met;
extract numerical value preceding the case reporter;
extract numerical value succeeding the case reporter; and
generate an entry on the list of legal authorities comprising the numerical value preceding the case reporter, the case reporter, and the numerical value succeeding the case reporter;
transmit via the communications network the list of the legal authorities to the repository;
download from the repository documents embodying the legal authorities from the list of the legal authorities;
translate the documents embodying the legal authorities to one or more files comprising an audibly perceptible format, wherein the audibly perceptible format comprises a sound file comprising a spoken version of text associated with the legal authorities;
remove from the files at least a first or a second portion of a citation to a case, wherein the first portion of the citation to the case comprises case reporter information associated with the case, and the second portion of the citation to the case comprises an identity of a court associated with the case; and
cause an audio device in logical communication with the apparatus to audibly broadcast the files with a voice synthesizer, wherein the voice synthesizer generates alternative case information to substitute into the files in place of at least the first or second portion of the citation to the case.

8. The apparatus of claim 7, wherein the case law subroutine further comprises instructions to:
continue searching the text-based line for an additional character string "v.";
if the additional character string "v." occurs within the text-based line, then repeat this loop from the step of if "v." is not italicized, then continue searching; and
else, if the text-based line does not consist of an additional character string "v.", then move to a second text-based line.

9. The apparatus of claim 8, wherein the apparatus comprises a smart device.

10. The apparatus of claim 9, wherein the audio device comprises speakers in logical connection to the smart device.

11. The apparatus of claim 8, wherein the instructions to transmit the list of legal authorities further includes a citing authorities subroutine, comprising:
assessing the presence or absence of citing authorities for a given legal authority;
based upon a presence of citing authorities, applying a filter condition to obtain a filtered list of citing authorities; and adding the filtered list of citing authorities to the list of legal authorities.

12. The apparatus of claim 7, wherein the software is operable to parse the legal document using a treatise subroutine comprising the steps of:

for each text-based line of the legal document:
- search text-based line for a text string comprising a length of greater than a first predetermined number of characters that uses small caps formatting;
- search a second predetermined number of characters after the text string;
- if the second predetermined number of characters after the text string does not comprise one or more numerical values, then continue searching the text-based line for an additional character string comprising small caps formatting;
- else, if the second predetermined number of characters after the text string does comprise one or more numerical values, then extract the numerical values;
- generate an entry on the list of legal authorities comprising the text string that uses small caps formatting and the numerical values;
- continue searching the text-based line for an additional character string comprising a length of greater than the first predetermined number of characters that uses small caps formatting;
- if the additional character string comprising a length of greater than the first predetermined number of characters that uses small caps formatting, then repeat this loop from the step of search a second predetermined number of characters after the text string; and
- else, if the text-based line does not consist of an additional character string comprising a length of greater than the first predetermined number of characters that uses small caps formatting, then move to a second text-based line.

\* \* \* \* \*